United States Patent [19]
Broome

[11] Patent Number: 5,444,569
[45] Date of Patent: Aug. 22, 1995

[54] COLLAPSIBLE TERRESTRIAL TELESCOPE

[75] Inventor: Barry G. Broome, Glendora, Calif.

[73] Assignee: Steven Spence Adkinson, Beverly Hills, Calif.

[21] Appl. No.: 30,786

[22] Filed: Mar. 12, 1993

[51] Int. Cl.⁶ .................. G02B 23/24; A61B 1/04
[52] U.S. Cl. ................... 359/435; 359/362; 359/399; 359/434
[58] Field of Search ............ 359/399, 423, 434, 435, 359/656, 661, 708, 713, 716, 719; 128/4–6

[56] References Cited

U.S. PATENT DOCUMENTS

| | | | |
|---|---|---|---|
| 4,367,010 | 1/1983 | Broome | 359/708 |
| 4,784,118 | 11/1988 | Fantone et al. | 359/434 |
| 4,938,573 | 7/1990 | Saito | 359/719 |
| 4,993,817 | 2/1991 | Hoogland | 359/435 |
| 5,054,897 | 10/1991 | Ozawa | 359/708 |
| 5,184,252 | 2/1993 | Miyauchi et al. | 359/716 |

Primary Examiner—Loha Ben
Assistant Examiner—Thong Nguyen
Attorney, Agent, or Firm—Cumpston & Shaw

[57] ABSTRACT

A collapsible terrestrial telescope having a lens system which includes an objective lens and a terrestrial eyepiece, wherein the eyepiece includes an erecting lens group, and an eyepiece lens. The objective lens and the erecting lens group each include an aspheric surface. The objective lens may be one of an optically interchangeable doublet including a positive element having the aspheric surface and a negative element, or a singlet having the aspheric surface and a diffractive surface.

45 Claims, 13 Drawing Sheets

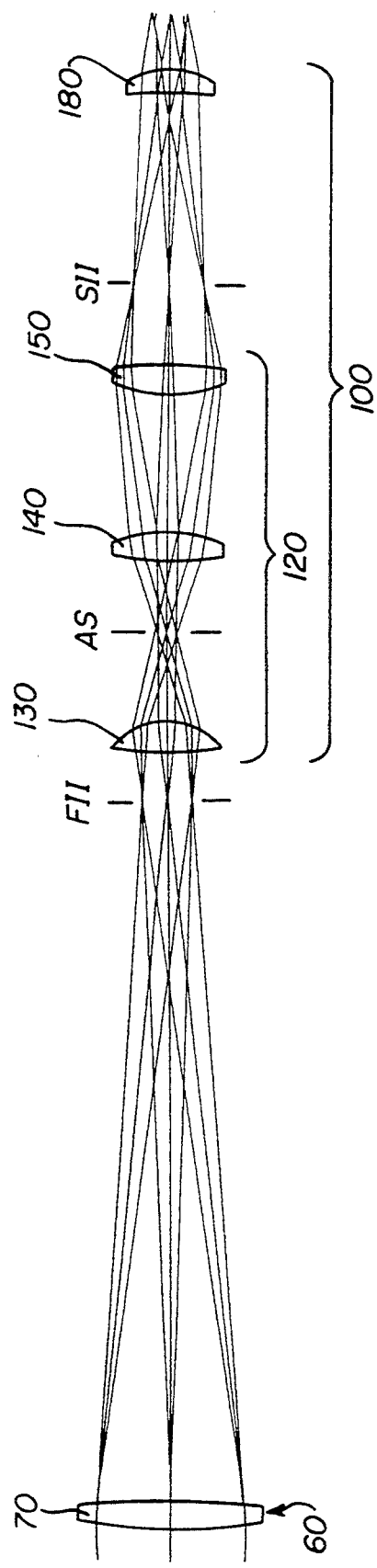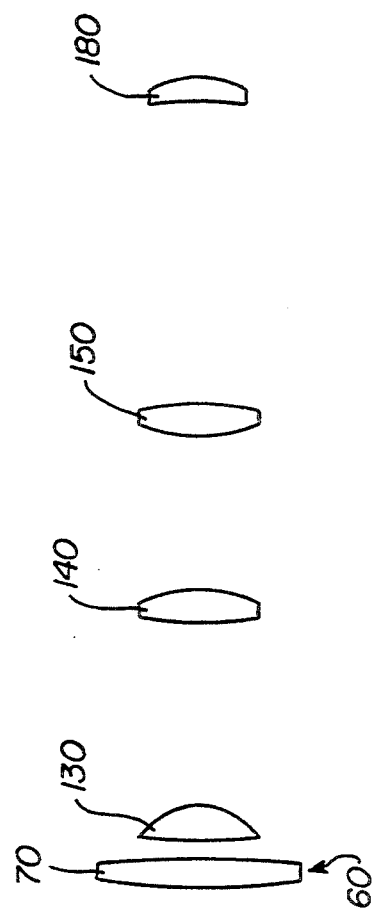
FIG. 5
FIG. 6

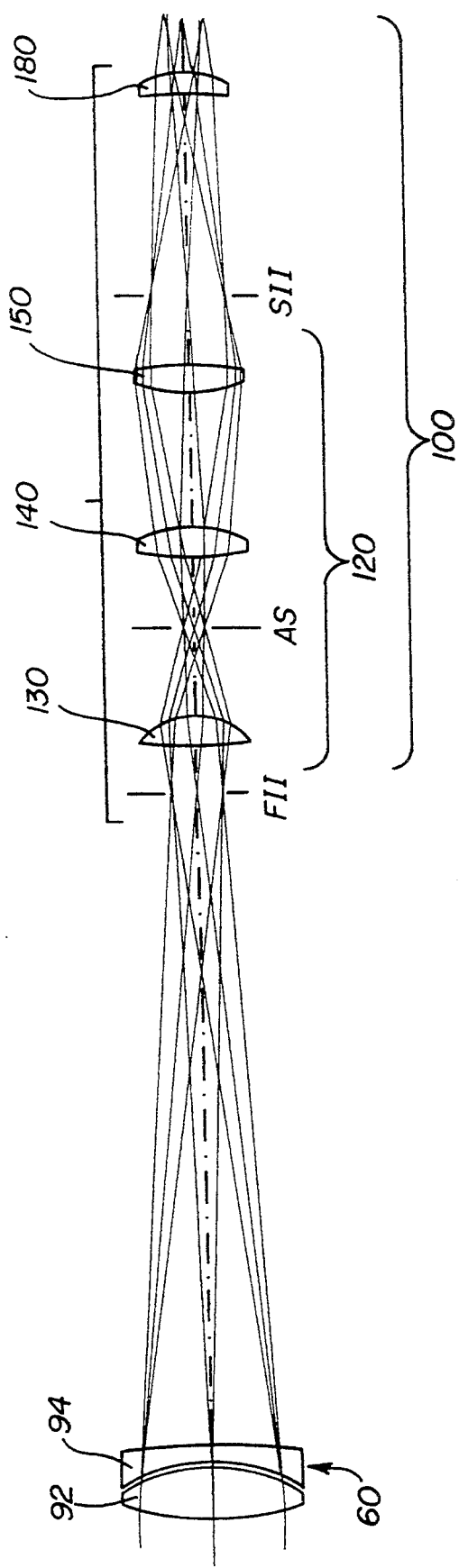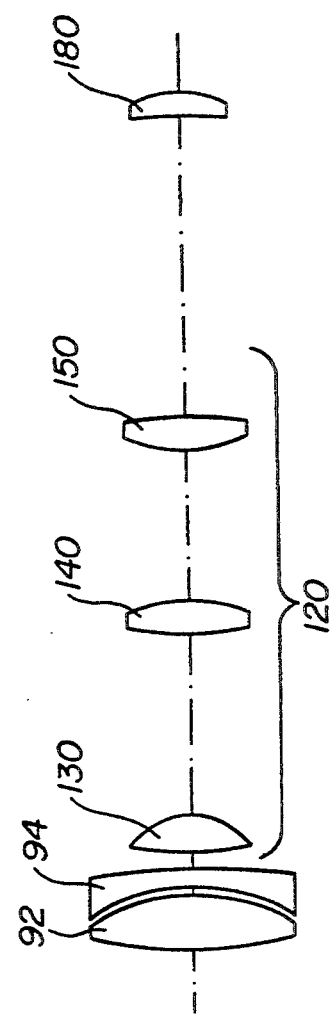
FIG. 7
FIG. 8

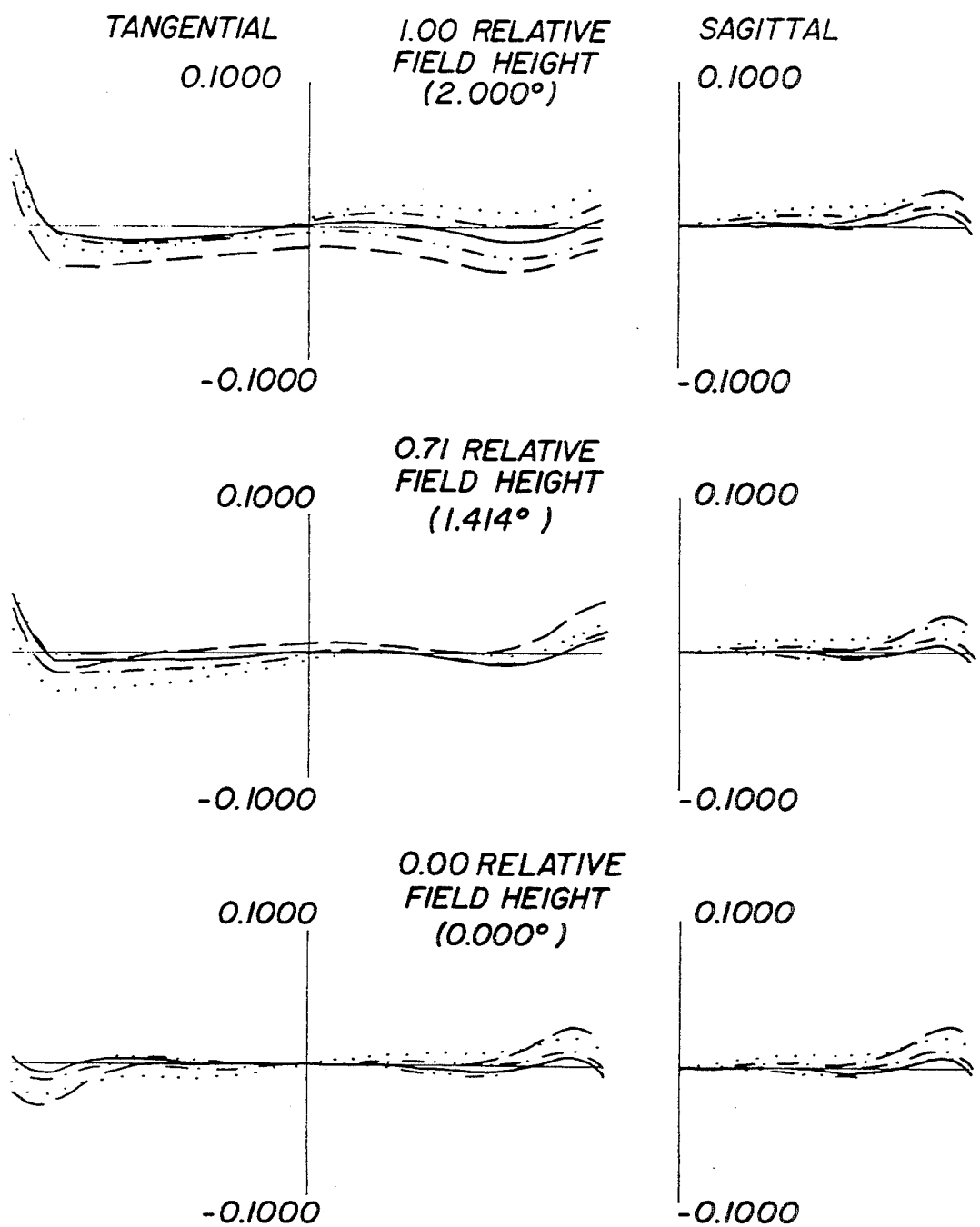

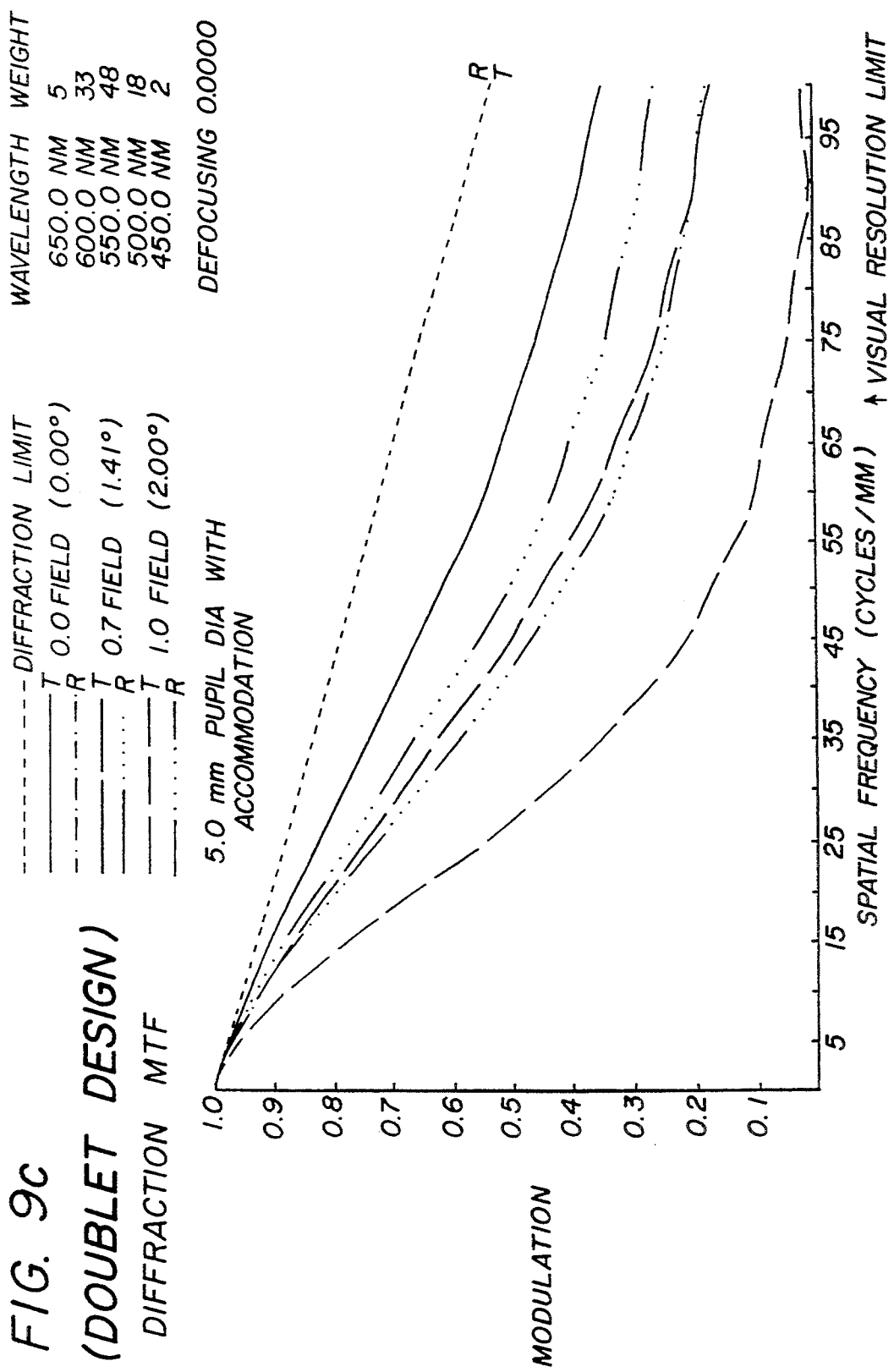

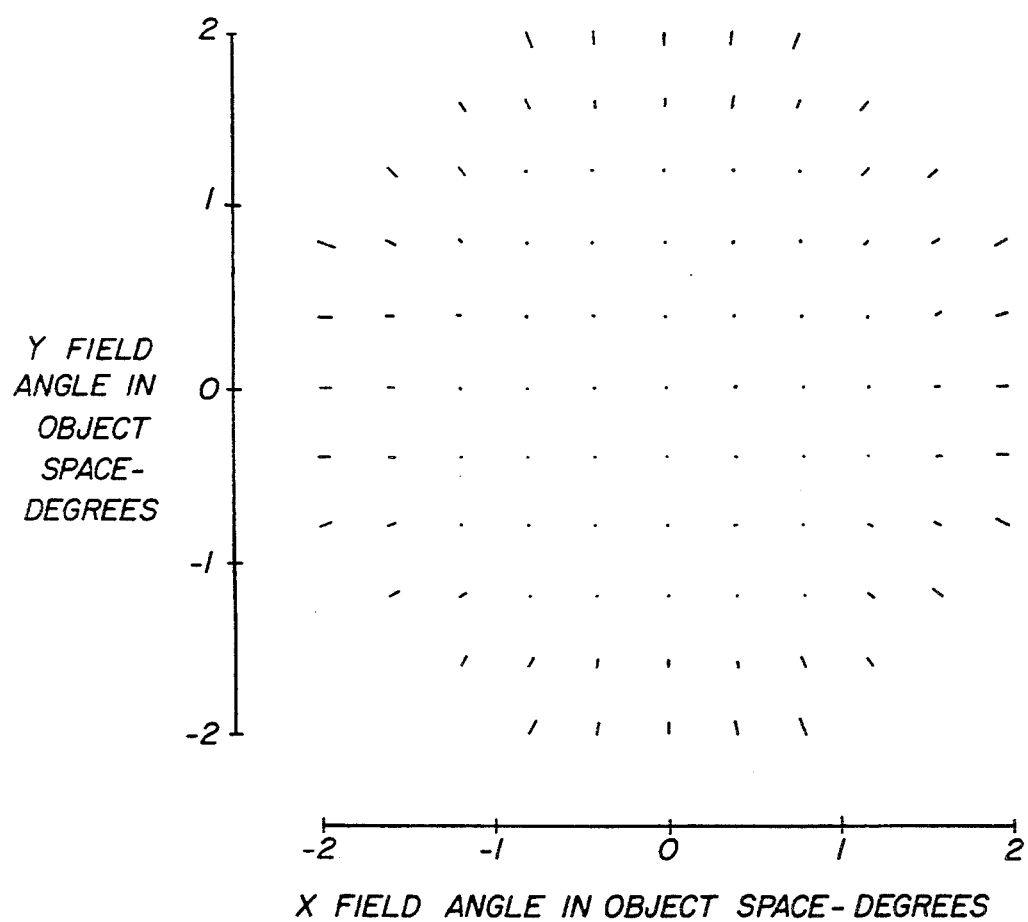

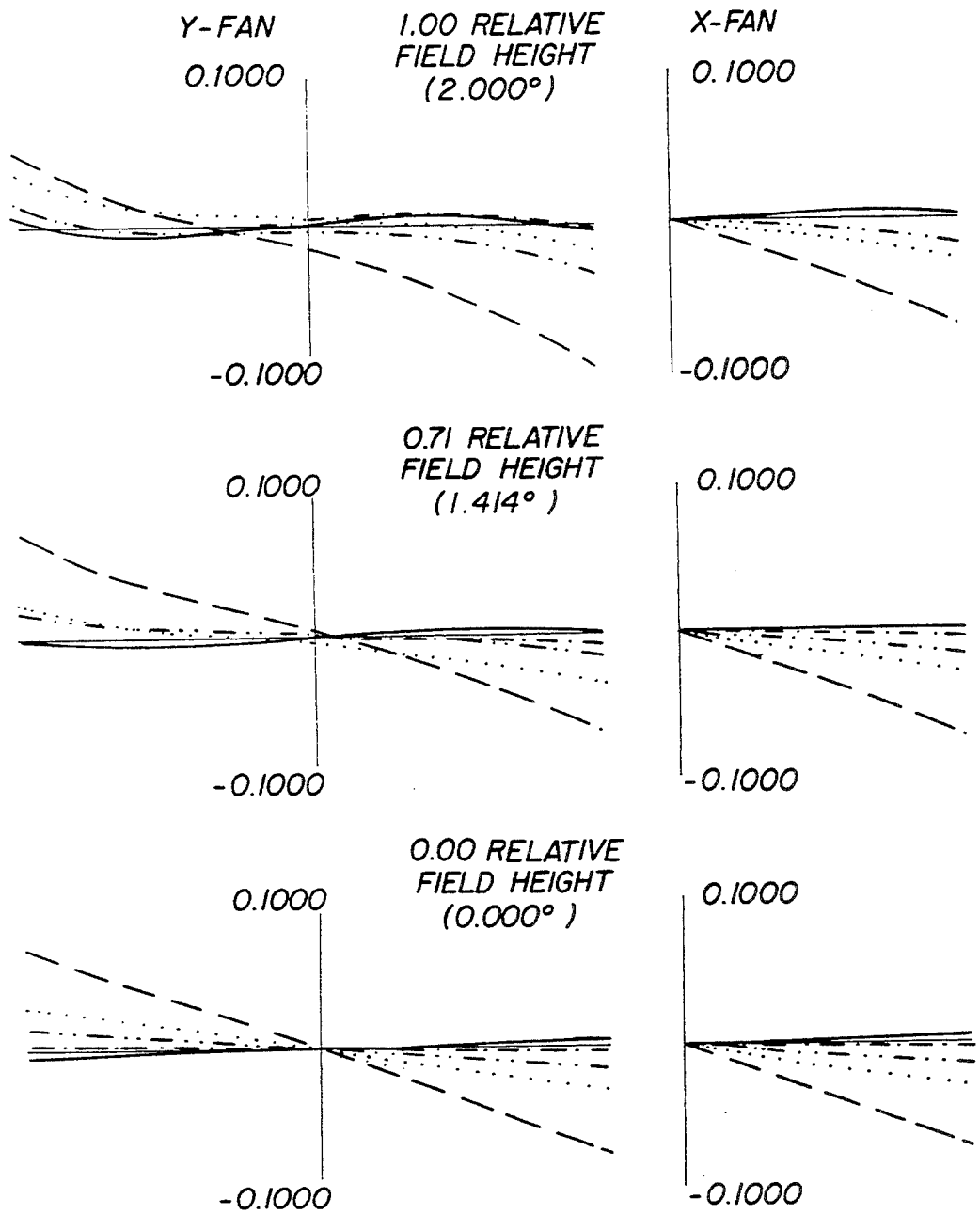

(BINARY DESIGN)

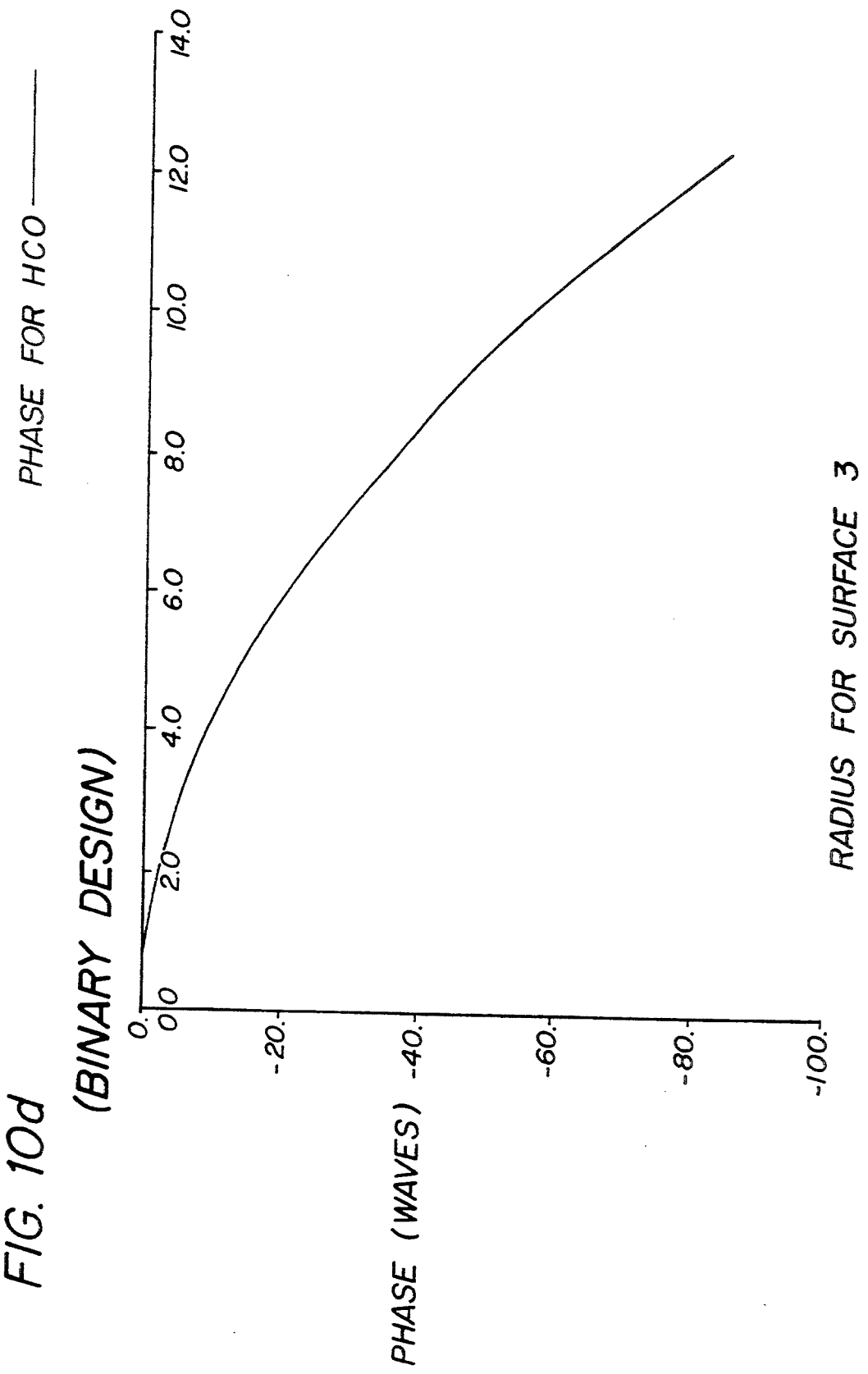
FIG. 10d (BINARY DESIGN)

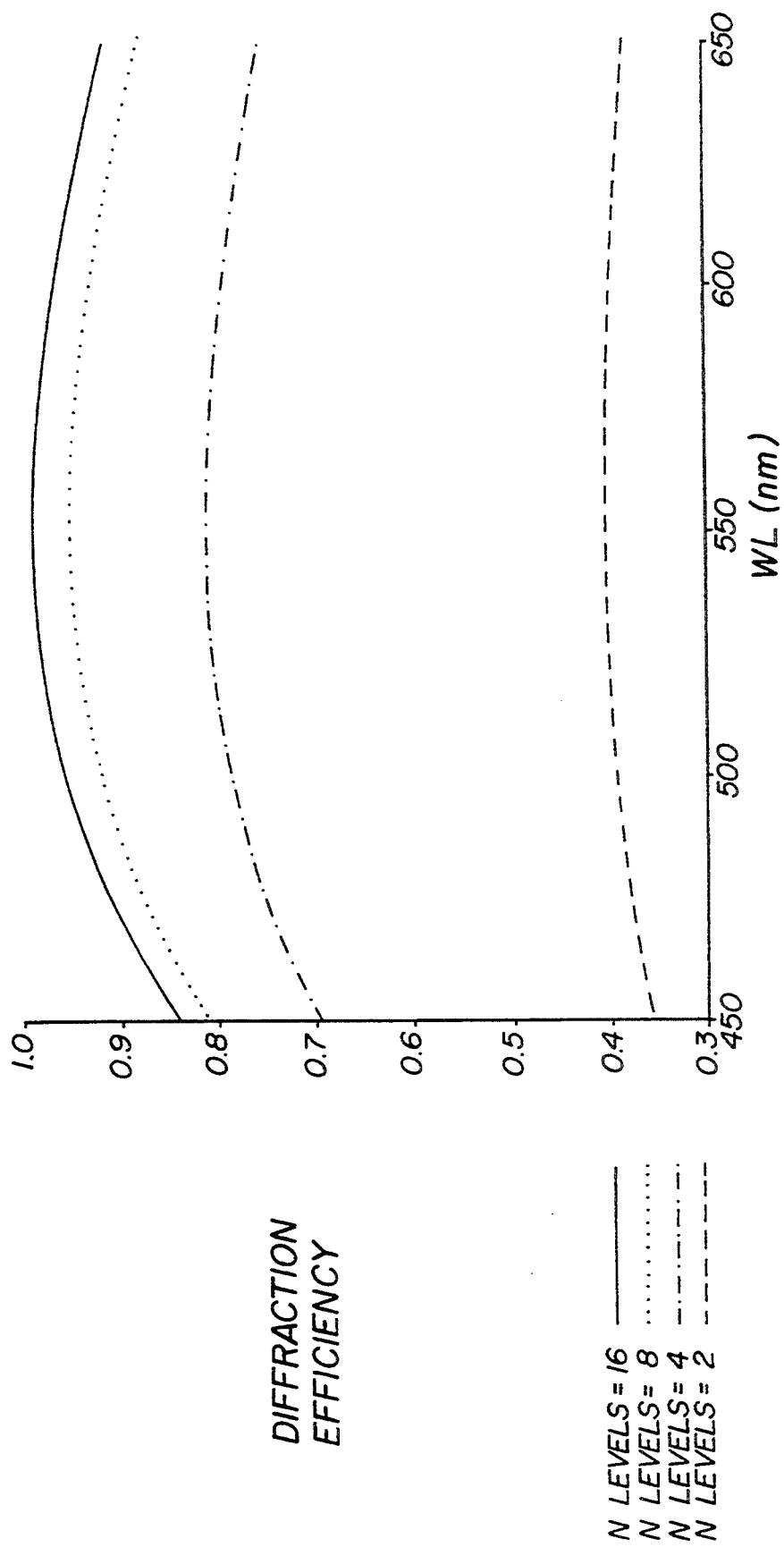
FIG. 10e  SCALAR DIFF. EFF. vs WAVELENGTH, ORDER=1

COLLAPSIBLE TERRESTRIAL TELESCOPE

BACKGROUND OF THE INVENTION

The present invention relates the field of terrestrial telescopes, and more particularly, to a compact collapsible terrestrial telescope employing an objective lens and a terrestrial eyepiece, wherein both the objective lens and the terrestrial eyepiece include an aspheric surface.

Terrestrial telescopes are distinguished from astronomical telescopes by the production of an erect image. That is, terrestrial telescopes provide an erect image for observation in combination with angular magnification of the object field.

Terrestrial telescopes may be generally divided into five classes. The first class is a Galilean telescope in which an objective lens group is separated from an eyepiece lens group by a relatively large intervening air space. No intermediate image exists in the Galilean telescope and magnification is limited to less than approximately 3× for a useful (approximately 4 degrees) full object field diameter. Galilean telescopes are often referred to as "opera glasses." However, image quality is limited and the devices have a small field of view and minimal magnifying power.

The second class of terrestrial telescopes includes the Keplerian telescope with erecting prisms. Many binoculars and spotting telescopes employ this design. This Keplerian telescope includes an objective group and an eyepiece group, wherein the focal point of the objective group coincides with the focal point of the eyepiece group to produce an intermediate image. A set of erecting prisms (e.g. porro or roof prisms) is placed near the intermediate image to erect the image. The Keplerian telescope provides substantial angular magnification, up to 20X and the field of view can be as large as 7 degrees for a 7X instrument. However, the prisms add undesired weight and expense to the telescope.

The third group of terrestrial telescopes includes the Keplerian telescope with a symmetric erecting relay. The erect image in this Keplerian telescope is formed by an image forming relay between the objective lens group and the eyepiece lens group. This Keplerian telescope forms two intermediate images. The image forming relay includes two lens groups which are identical and separated by the sum of their focal points with an image of the aperture stop midway between the lens groups. That is, the image forming relay is symmetrical about the aperture stop. U.S. Pat. No. 4,367,010 is exemplary of the symmetric Keplerian telescope.

A fourth class of terrestrial telescopes includes a Keplerian telescope with extended eye relief. In the extended Keplerian telescope, two erecting relay elements are located adjacent to each other so that the aperture stop image lies outside the relay group. While the extended Keplerian telescope can be relatively short, thereby maintaining relatively long eye relief, the diameter and weight of the relay elements increases both cost and weight of the device.

The final class of terrestrial telescopes is the Keplerian telescope with a terrestrial eyepiece. The terrestrial eyepiece employs four element groups to erect the image and present the image for viewing. The first three elements of the eyepiece are typically plano convex elements and form an erector. The remaining element presents the image for viewing. As optical glass elements with spherical surfaces operate over a very limited (typically 2 degrees) full object field and have large optical aberrations that limit image resolution, the terrestrial eyepiece has long been disfavored.

Therefore, a need exists for a cost efficient collapsible terrestrial telescope capable of producing a high quality image. In addition, the need exists for a collapsible terrestrial telescope which provides an adequate field of view and magnification without requiring excessive weight.

SUMMARY OF THE INVENTION

The present invention provides a compact erecting telescope having an objective lens optically aligned with a terrestrial eyepiece, wherein both the objective lens and the terrestrial eyepiece include an aspheric optical surface.

The lens system of the present invention employs selected aspheric surfaces on molded plastic optical components to provide a compact collapsible terrestrial telescope having an improved image quality. The present configuration provides at least 5X angular magnification, in a telescope having a length of approximately 10 inches.

The lens system includes an objective lens having at least one aspheric surface. The objective lens may be either of an optically interchangeable molded doublet, or a molded singlet with a diffractive rear surface.

The terrestrial eyepiece includes an erecting lens group and an eyepiece lens. The erecting lens group includes first, second and third erecting lens elements, wherein at least one of the erecting lens elements includes an aspheric surface. The eyepiece lens presents the erected image for viewing,

BRIEF DESCRIPTION OF THE DRAWINGS

FIG. 5 is a schematic top plan view of a lens system in the operative position having a singlet objective lens;

FIG. 6 is a schematic top plan view of the lens system of FIG. 5 in a collapsed position;

FIG. 7 is a schematic top plan view of a lens system in the operable position having a doublet objective lens;

FIG. 8 is a schematic top plan view of the lens system in FIG. 7 in a collapsed position.

FIGS. 9a–9d are graphs representing performance characteristics of the doublet lens system; and FIGS. 10a–10e are graphs representing performance characteristics of the singlet lens system.

DETAILED DESCRIPTION OF THE PREFERRED EMBODIMENTS

Figure 1:
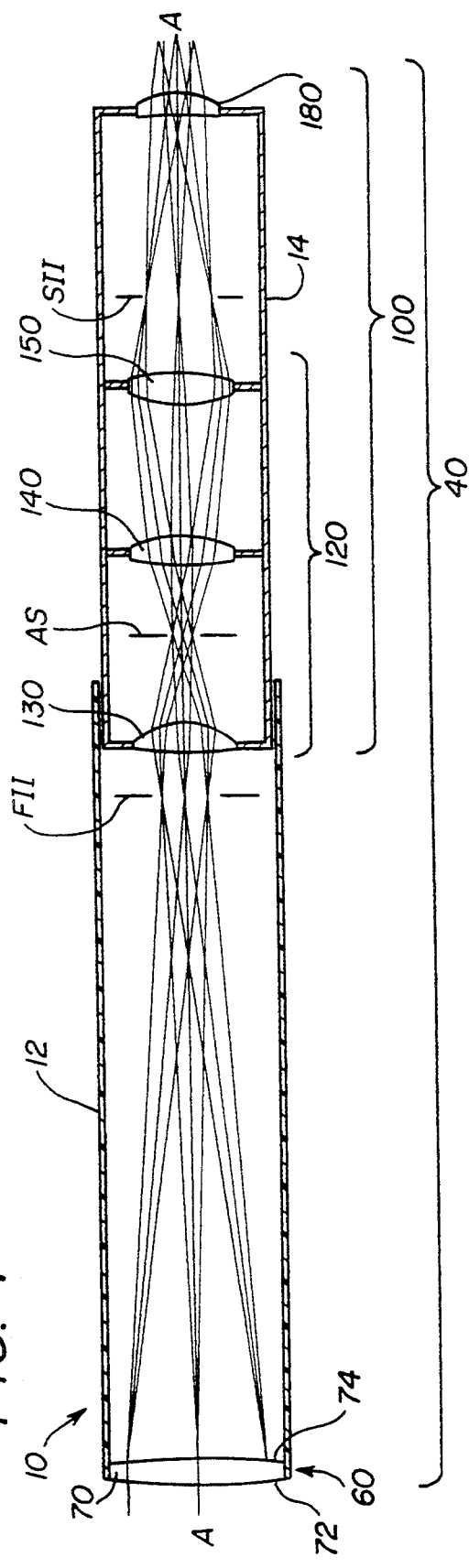
FIG. 1 is a cross sectional view taken along the optical axis of the collapsible telescope in an operative position showing the lens system having a singlet objective lens.
Figure 2:
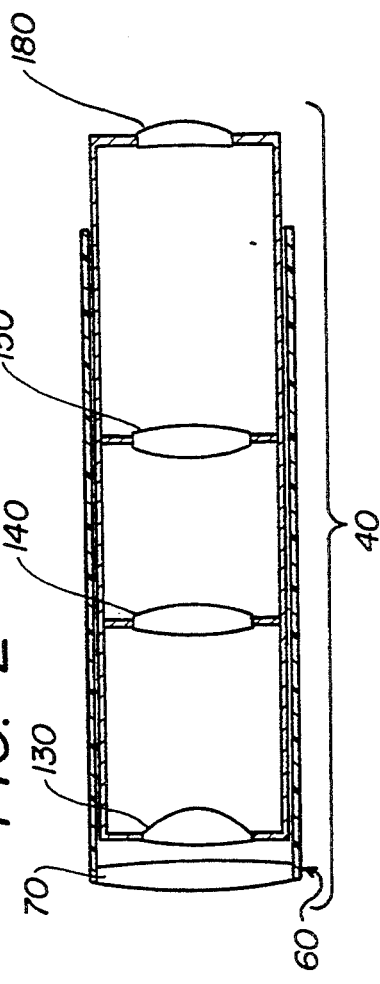
FIG. 2 is a cross sectional view along the optical axis showing the telescope of FIG. 1 in a collapsed position.

Referring to FIGS. 1–4, the present lens system 40 is employed in a collapsible telescope 10. The lens system 40 includes an objective lens 60 having a plurality of lens surfaces, and a terrestrial eyepiece 100. The terrestrial eyepiece 100 includes an erecting lens group 120 and an eyepiece lens 180. Each lens of the lens system 40 is optically aligned along a common optical axis a.

The specific parameters of the preferred embodiments of each lens element are set forth in Table A1 and FIGS. 9a–9d, and Table B1 and FIGS. 10a–10e. Therefore, only the general descriptions of the optical surfaces will be used in setting forth the configuration of the lens system 40. For definitional purposes, the lenses in the lens system 40 are described in terms of a front surface and a rear surface. The front surface is that surface nearer the object being viewed, and the rear surface is that surface towards the user. As used herein, optical surfaces include lenses or lens surfaces through which the image passes.

Figure 3:
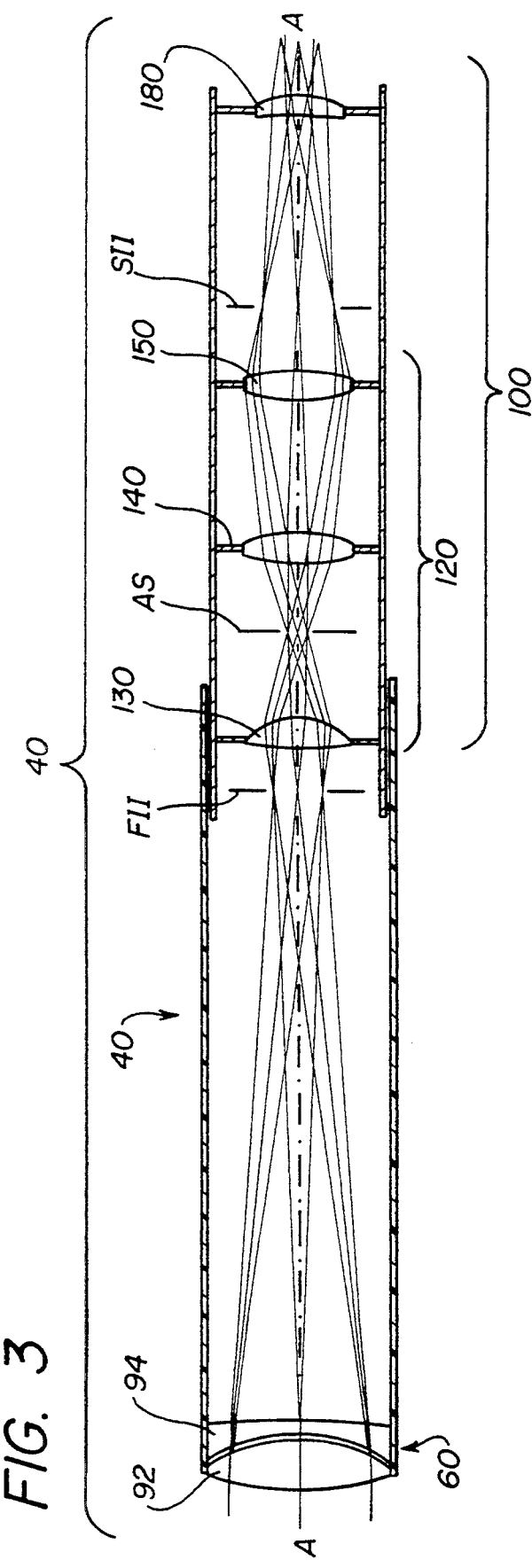
FIG. 3 is a cross sectional view taken along the optical axis of the collapsible telescope in the operative position showing the lens system having a doublet objective lens.
Figure 4:
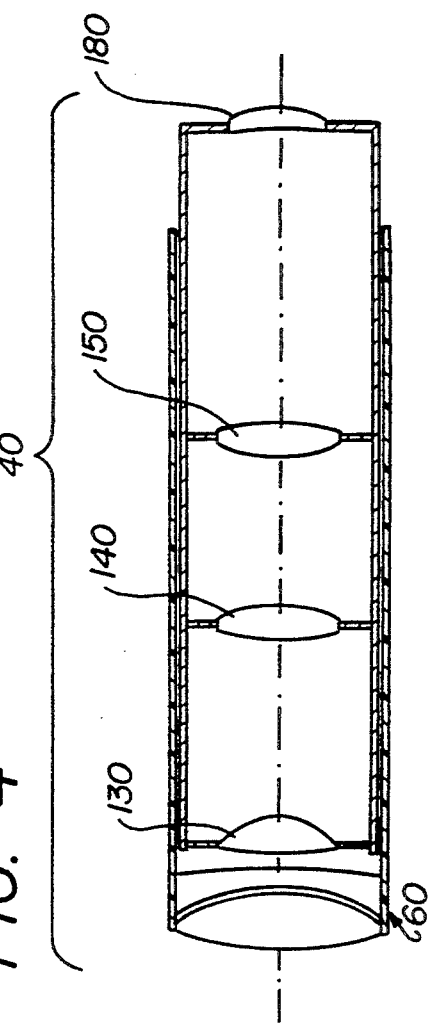
FIG. 4 is a cross sectional view taken along the optical axis showing the telescope of FIG. 3 in a collapsed position.
Figure 9A:
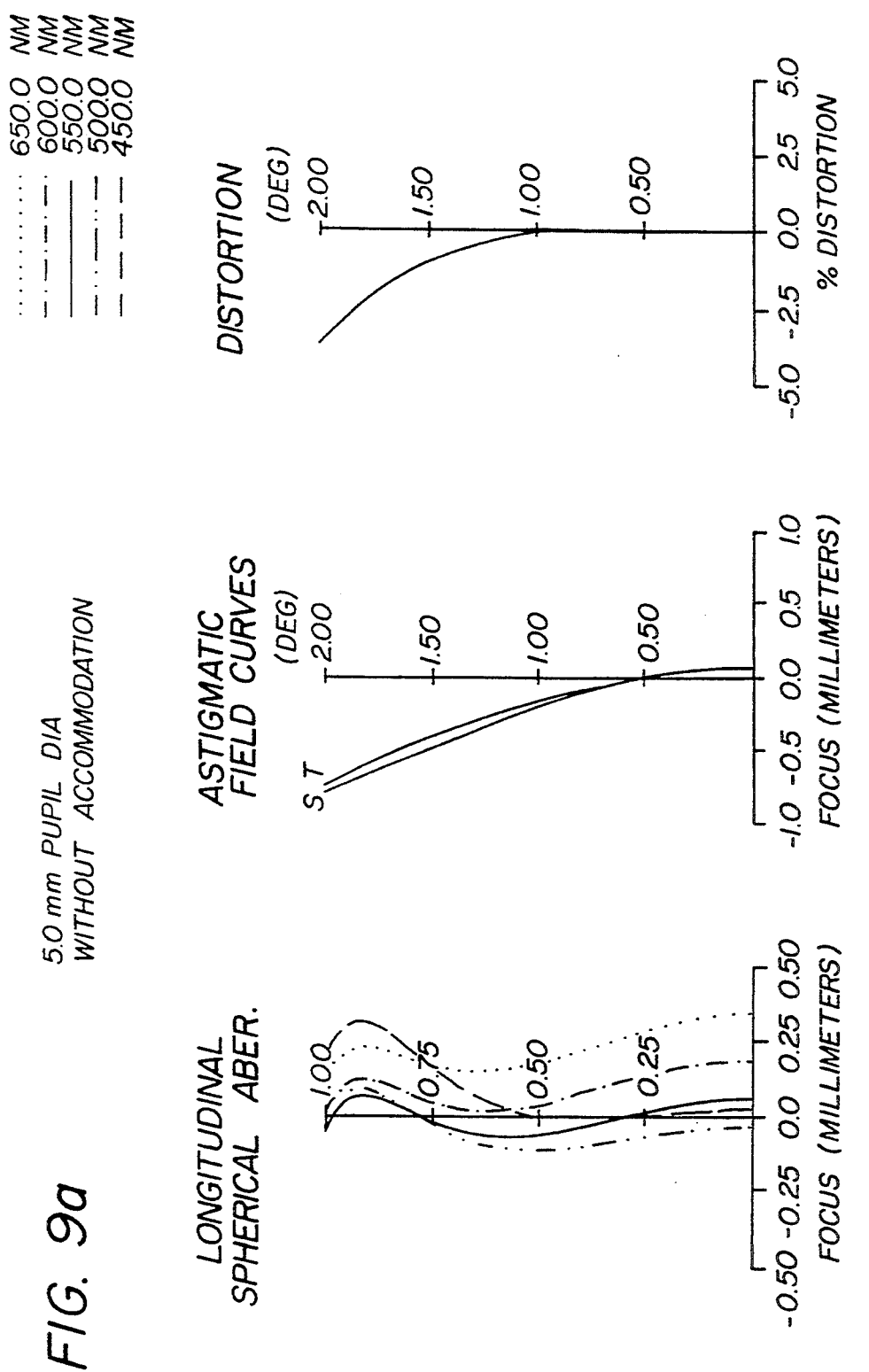
Figure 10A:
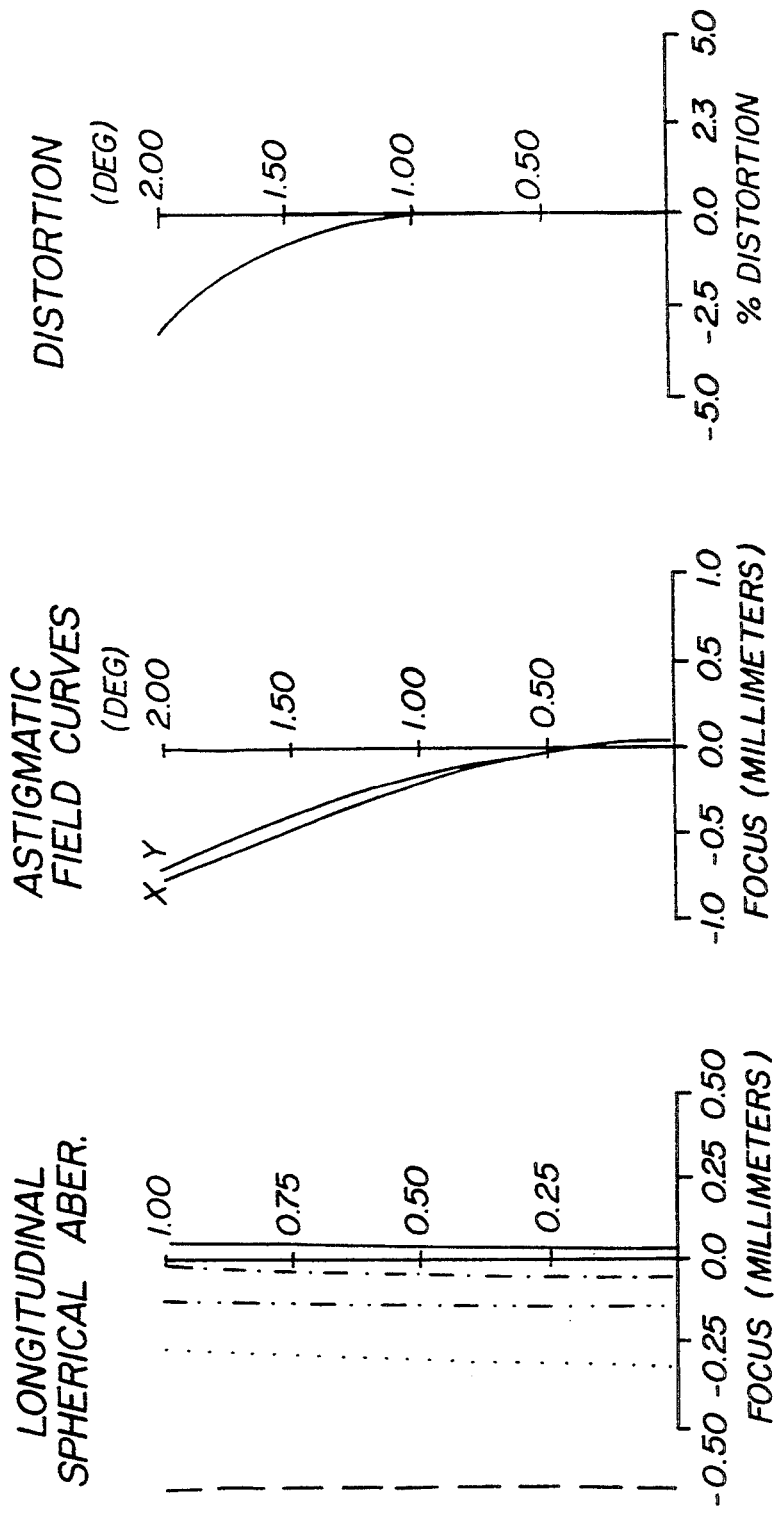
Figure 10C:
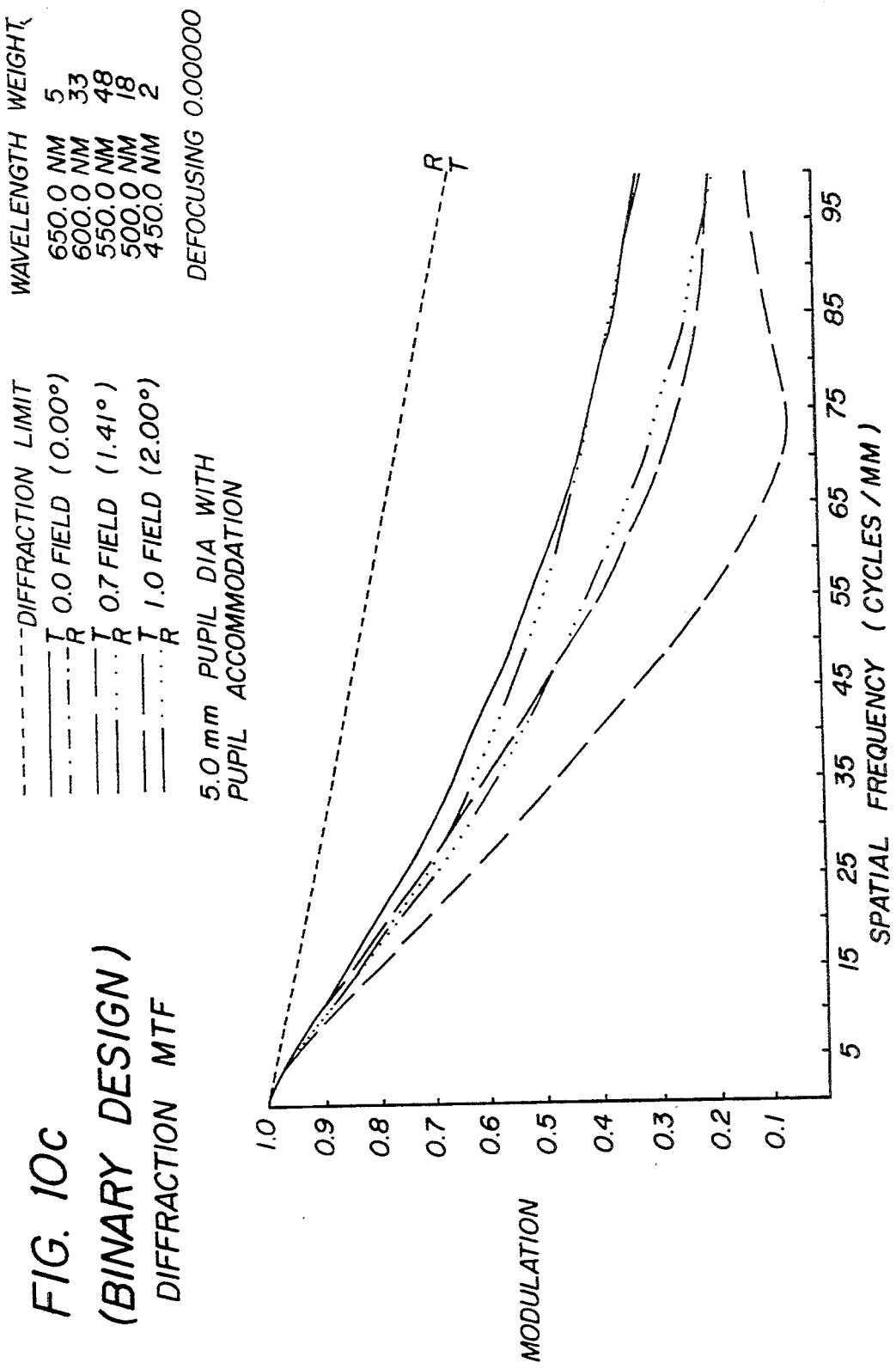

The collapsible telescope 10 includes a cylindrical outer housing 12 and a cylindrical inner housing 14, wherein the inner housing is sized to be slidably received within outer housing. Preferably, the outer housing 12 retains the objective lens 60 adjacent one end of the housing. A first end of the inner housing 14 includes the erecting lens group 120, and a second end of the inner housing includes the eyepiece lens 180. In the operative configuration, the erecting lens group 120 is optically intermediate of the objective lens 60 and the eyepiece lens 180 and preferably aligned along the common optical axis A, as shown in FIGS. 1 and 3.

Objective Lens

The objective lens 60 may be either of an optically interchangeable singlet lens 70 (FIGS. 1, 2, 5 and 6) or a doublet 92,94 (FIGS. 3, 4, 7 and 8). In either configuration the objective lens 60 includes an aspheric surface. Preferably, the aspheric surface is formed on the front of the objective lens 60.

Referring to FIGS. 1, 2, 5 and 6, the singlet objective lens 70 includes a front surface 72 and a rear surface 74. In the singlet objective lens 70, the front surface 72 is aspheric and the rear surface 74 is diffractive. The aspheric front surface 72 is defined in Table B1.

The performance characteristics of the singlet lens systems are shown in Tables B2–B5. The diffractive rear surface 74 is preferably kinoform. A kinoform is similar to a very fine structured Fresnel lens. The kinoform surface includes a plurality of concentric annular zones of continually decreasing width progressing from the center of the lens to the edge. In a manner similar to a diffractive grating which disperses white light into a color spectrum, the kinoform changes the axial focus of each color component of the image.

Preferably, the kinoform surface is a set of concentric rings approximately 43 micro inches in depth having tilted facets (not binary steps) with an annular zone width that varies from approximately 0.0085 inches at the center of the optical element to 0.0030 inches at the edge of the element.

As shown in FIGS. 3, 4, 7 and 8, the doublet objective 92,94 includes two elements, the first element 92 is a positive optical element and the second objective lens element 94 is a negative element. Preferably, the front surface of the first objective element 92 is aspheric. The aspheric surface is defined by the formula in Table A1. The performance characteristics of the doublet lens system are shown in Tables A2–A6.

The rear surface of the first element 92 is spherical. The front surface of the negative element is concave and the rear surface of the negative element is convex. These surfaces are also defined in Table A1. Each optical element in the objective lens 60 is preferably formed of a plastic material having its spectral dispersion chosen to minimize chromatic aberrations.

Terrestrial Eyepiece

The terrestrial eyepiece 100 is optically aligned with the objective lens 60 and includes the erecting lens group 120 and the eyepiece lens 180. Each lens surface of the terrestrial eyepiece 100 is specifically set forth in Tables A1 and B1. The erecting group 120 erects the image received from the objective lens 60, and the eyepiece lens 180 permits the observer to view the erected image. Each of the optical elements in the terrestrial eyepiece 100 is preferably formed of a plastic material having its spectral dispersion chosen to minimize chromatic aberrations.

The erecting lens group 120 includes a first 130, a second 140, and a third element 150. As shown in FIGS. 1–8, the rear surface of the first erecting lens element 130 is aspheric. In the present design, as the rear surface of the first erecting lens element 130 is aspheric, the second and third lens elements 140, 150 may be identical optical elements. That is, the optical surfaces of the second and the third erecting lens elements 140, 150 are defined by identical parameters. As shown in FIGS. 1–8 in their operative positions, the second and third lens elements 140, 150 are opposed to each other. That is, the front surface of the second element 140 is identical to the rear surface of the third element 150, and the rear surface of the second element is identical to the front surface of the third element.

Referring to FIGS. 1, 3, 5 and 7, in the operative position, the lens system 40 defines a first intermediate image (FII); a second intermediate image (SII); and an aperture stop (AS). The first intermediate image (FII) is formed adjacent the front surface of the first erecting lens element 130. The second intermediate image (SII) is formed adjacent the rear surface of the third erecting lens element 150. The aperture stop (AS) is formed intermediate of the first 130 and the second erecting lens element 140.

Preferably, the aspheric surface in the terrestrial eyepiece 100 is chosen to lie as close to the first intermediate image (FII) as possible. The first erecting lens element 130 is adjacent to the first intermediate image and the third eyepiece element 150 is adjacent to the second intermediate image (SII). As the second element is adjacent to the aperture stop (AS), it is associated with the aberrations corrected by the aspheric surface in the objective lens 60.

Alternatively, the rear surface of the third erecting lens element 150 may be aspheric (not shown), having a sufficient curvature to correct optical aberrations. However, if the rear surface of the third erecting lens element 150 is aspheric, then the second 140 and third elements may not be identical.

Theory of Operation

In the preferred embodiment shown in FIGS. 1, 2, 5 and 6, all the optical elements are formed of a molded acrylic plastic material. A preferred material is an acrylic having a specific molding grade "RAHVS" which is Rohm and Haas VS optical grade acrylic. However, other materials and molding grades may be used, and nonacrylic materials with low dispersions may be substituted. The doublet objective lens 60 is formed of two different materials such as acrylic and NAS-70. These materials provide axial chromatic aberration correction and exhibit favorable molding qualities.

In each embodiment of the lens system 40, all optical elements are non plano elements. It is preferred that all the optical elements, including the aspheric surfaces are formed of the molded plastic. Each of the non-aspheric optical surfaces of the lens system 40 are spherical. There are no plano surfaces.

Preferably, each optical surface includes an anti-reflection coating, as is well known in the art. While noncoated surfaces typically reflect only 4% of the light, this reflection becomes further reflected or scattered and falls on an image plane, thereby reducing contrast. In addition, as the doublet objective lens system includes 12 optical surfaces, only 60% of the available light would be transmitted to the viewer.

In operation, the molded doublet 92,94 and the singlet 70 may be used interchangeably for the objective lens 60. By placing the aspheric surface on the front of the singlet objective lens 70, the spherical aberration in the telescope is substantially eliminated. The remaining axial chromatic aberration is substantially eliminated by placing a diffractive surface on the rear surface of the singlet.

Locating an aspheric surface on the rear of the first erecting lens element 130, or on the rear of the third erecting lens element 150 effectively and substantially remove coma and astigmatism aberrations of the entire telescope. Therefore, locating the aspheric surfaces on front surface of the objective lens 60 and the rear surface of the first erecting lens element 130 substantially eliminates all non-chromatic aberrations in the lens systems 40.

The objective lens 60 introduces sufficient color aberration correction to correct for the color aberrations of all the remaining optical elements in the lens system. With respect to the doublet objective lens 92,94, axially chromatic aberration is removed by employing the negative element 94. The doublet objective lens 92,94 does not produce or correct any lateral chromatic aberration. This is a result of locating the objective lens 60 at an aperture stop of the lens system. That is, the specific choice of terrestrial eyepiece 100 element powers and positions with respect to the aperture stop substantially cancels the lateral chromatic aberration introduced by each optical element.

In a preferred embodiment, the present lens system 40 provides a 5X power telescope with an enhanced image quality. In the extended position, the telescope has a length of approximately 9.7 inches and may be compressed to the length of approximately 5 inches. In addition, the lens diameter permits the telescope to have a diameter of approximately 1.25 inches. In the preferred embodiment, a 4 degrees object field of view covers approximately 21 feet at 100 yards, which is believed to be optimal for sporting events. A 5 mm pupil diameter provides high brightness viewing even during evening games with limited illumination.

In the present lens system 40, the apparent field of view is approximately 20°. Therefore, because the high resolution area of the eye is only approximately 5° in the diameter, the observer will roll the eye to view features not at the center of the field. As the eye rolls, the eye will immediately refocus on the new field point. Preferably, the lens system 40 requires at most approximately 1.0 diopter of refocusing from the center to the edge of the field.

Referring to Table A1, the ratio of clear aperture diameter to axial length (thickness) for each of the first erecting lens element 130, the second erecting lens element 140 and the third erecting lens element 150 in the erecting lens group 120 is greater than 1. As set forth in Table B1, the singlet objective lens embodiment recites a ratio of clear aperture diameter to axial length greater than 1 for each of the first erecting lens element 130, the second erecting lens element 140 and the third erecting lens element 150.

While a preferred embodiment of the invention has been shown and described with particularity, it will be appreciated that various changes and modifications may suggest themselves to one having ordinary skill in the art upon being apprised of the present invention.

TABLE A1

The optical surfaces of the lens system 40 having the doublet objective lens 92,94 are defined by Table A1. The clear apemm diameter is the diameter of the light ray bundle passing through the lens. The optical elements are aligned along the optical axis A. A positive radius indicates a center of curvature to the right, a negative radius indicates a center of curvature to the left, and all values are in millimeters for a reference wavelength of 550.0 nanometers.

| Element # | Radius of Curvature (front) | Radius of Curvature (rear) | Thickness (axial) | Axial Intra-element spacing | Clear aperture Diameter (front surface) | Clear aperture diameter (rear surface) | Material |
|---|---|---|---|---|---|---|---|
| Positive objective element 92 | 62.79 (vertex) A(1) | −28.0285 convex | 8.8900 | 1.0160 | 25.4000 | 25.0394 | Acrylic |
| Negative objective element 94 | −26.1477 concave | −136.5250 convex | 2.5400 | 115.3510 | 24.3114 | 24.1842 | NAS |
| First erecting lens element 130 | 49.8797 convex | −8.414 (vertex) A(2) | 5.7150 | 27.6142 | 11.2890 | 11.6799 | Acrylic |
| Second erecting lens element 140 | 40.0434 convex | −25.4975 convex | 5.0800 | 23.5071 | 11.9174 | 13.0788 | Acrylic |
| Third erecting lens element 150 | 25.4975 convex | −40.0434 convex | 5.0800 | 45.9915 | 18.2641 | 17.9747 | Acrylic |
| Eyepiece 180 | −76.2000 concave | −15.9232 convex | 3.8350 | 9.5250 (eye relief) | 9.5872 | 9.5463 | Acrylic Acrylic | wherein the aspheric curvatures A(1) and A(2) are defined by a sag Z as follows:

TABLE A1-continued $$Z = \frac{(CURV) Y^2}{1 + [1 - (1 + K)(CURV)^2 Y^2]^{\frac{1}{2}}} + (A)Y^4 + (B)Y^6 + (C)Y^8 + (D)Y^{10}$$

in which (CURV), K, A, B, C, and D are constants having the following values:

| Aspheric curvature | (CURV) | K | A | B | C | D |
|---|---|---|---|---|---|---|
| A(1) | 0.01592427 | 2.794342 | 0.0000E+00 | 0.0000E+00 | 0.0000E+00 | 0.0000E+00 |
| A(2) | −0.11883237 | −1.543869 | 0.0000E+00 | 0.0000E+00 | 0.0000E+00 | 0.0000E+00 |

TABLE B1

The lens system 40 including the singlet objective lens 70 having the aspherical and diffractive surfaces is defined by Table B1. The clear aperture diameter is the diameter of the light ray bundle passing through the lens. The optical elements are aligned along the optical axis A. A positive radius indicates a center of curvature to the right, a negative radius indicates a center of curvature to the left, and all values are in millimeters for a reference wavelength of 550.0 nanometers.

| Element # | Radius of Curvature (front) | Radius of Curvature (rear) | Thickness (axial) | Axial Intra-element spacing | Clear aperture Diameter (front surface) | Clear aperture diameter (rear surface) | Material |
|---|---|---|---|---|---|---|---|
| Singlet Objective lens 70 | 95.405 (vertex) A(1) | −177.800 X(1) | 4.5720 | 25.4000 | 124.432 | 25.326 | Acrylic |
| First erecting lens element 130 | −49.880 convex | −8.414 (vertex) A(2) | 5.7150 | 27.6142 | 10.996 | 11.4123 | Acrylic |
| Second erecting lens element 140 | 40.0434 convex | −25.4975 convex | 5.0800 | 23.5071 | 11.709 | 12.859 | Acrylic |
| Third erecting lens element 150 | 25.4975 convex | −40.0434 convex | 5.0800 | 45.9915 | 17.891 | 17.594 | Acrylic |
| Eyepiece 180 | −76.2000 concave | −15.9232 convex | 3.8350 | 9.5250 (eye relief) | 9.766 | 9.765 | Acrylic | wherein the aspheric curvatures A(1) and A(2) are defined by a sag Z as follows:

$$Z = \frac{(CURV) Y^2}{1 + [1 - (1 + K)(CURV)^2 Y^2]^{\frac{1}{2}}} + (A)Y^4 + (B)Y^6 + (C)Y^8 + (D)Y^{10}$$

in which (CURV), K, A, B, C, and D are constants having the following values:

| Aspheric curvature | (CURV) | K | A | B | C | D |
|---|---|---|---|---|---|---|
| A(1) | 0.01048161 | −0.945521 | −2.07935E−07 | 0.0000E+00 | 0.0000E+00 | 0.0000E+00 |
| A(2) | −0.11885237 | −1.543869 | 0.0000E+−00 | 0.0000E+00 | 0.0000E+00 | 0.0000E+00 | and the kinoform surface X(1) is described by the phase polynominal:
$\phi(r) = (-0.5637 \, r^2) + (0.00005 \, r^4)$ waves, where r = radial distance from the optical axis.

What is claimed is:

1. A lens system for an erecting telescope for magnifying an image, comprising:
   (a) an objective lens having a plurality of lens surfaces, wherein at least one lens surface is aspheric;
   (b) an asymmetric erecting lens group including a first, a second, and a third lens element defining a plurality of optical surfaces for erecting an image formed by the objective lens, wherein at least one optical surface in the erecting lens group is aspheric and a ratio of an axial length to a clear aperture diameter of each lens element is less than one; and
   (c) an eyepiece lens optically aligned with the objective lens for viewing the erected image, such that the erecting lens group is optically intermediate of the eyepiece lens and the objective lens.

2. The lens system of claim 1, wherein the objective lens includes a doublet having a first positive element and a negative second element, the front surface of the first element being aspheric.

3. The lens system of claim 1, wherein the objective lens includes a singlet having an aspheric front surface and a diffractive rear surface.

4. The lens system of claim 3, wherein the diffractive rear surface is kinoform.

5. The lens system of claim 3, wherein the diffractive rear surface is single level binary.

6. The lens system of claim 3, wherein the diffractive rear surface is multi level binary.

7. The lens system of claim 1, wherein the object lens, first lens element, second lens element, third lens element and eyepiece lens are plastic.

8. The lens system of claim 1, wherein the rear surface of the first erecting lens element is aspheric.

9. The lens system of claim 8, wherein the front and rear surfaces of the second and third erecting lens elements are non-aspheric, and the second and third lens elements are identical.

10. The lens system of claim 1, wherein a rear surface of the first erecting lens element is aspheric and adjacent to a first intermediate image such that the rear surface primarily corrects optical aberrations including field curvature, astigmatism and distortion.

11. The lens system of claim 1, wherein the rear surface of the third erecting lens element is aspheric and adjacent a second intermediate image.

12. The lens system of claim 1, wherein the first, second, and third erecting lens elements and the eyepiece lens have a sufficient positive power and are located to substantially cancel lateral chromatic aberration of the lens system.

13. The lens system of claim 1, wherein the aspheric surface in the objective lens introduces sufficient spherical aberration to substantially correct for spherical aberrations of the erecting lens group and the eyepiece lens.

14. The lens system of claim 1, wherein each optical surface and lens surface is non plano.

15. The lens system of claim 1, further comprising:
(a) an aperture stop intermediate the first and the second lens elements; and wherein the aspheric optical surface in the erecting lens group cancels spherical aberration, coma and astigmatism to sufficiently self correct for optical aberrations to functionally cooperate with any one of a doublet objective lens and singlet objective lens such that magnification and field of view of the telescope are determined by the objective lens.

16. A lens system for an erecting telescope for magnifying an image, comprising:
(a) objective lens means having a plurality of lens surfaces for producing an image, the objective lens means having an aspheric lens surface;
(b) asymmetric terrestrial erecting lens means having a plurality of optical surfaces on a plurality of lens elements, each lens element having a ratio of a clear aperture diameter to an axial length greater than one for erecting the image formed by the objective lens means, wherein one of the optical surfaces is aspheric; and
(c) eyepiece means optically aligned with erecting lens means for viewing the erected image formed by the erecting lens means.

17. The lens system of claim 16, wherein the objective lens means includes a doublet group having a first positive element with an aspheric front surface, and a negative second element.

18. The lens system of claim 16, wherein the objective lens means includes a singlet having an aspheric front surface and a diffractive rear surface.

19. The lens system of claim 18, wherein the diffractive rear surface is kinoform.

20. The lens system of claim 18, wherein the diffractive rear surface is single level binary.

21. The lens system of claim 18, wherein the diffractive rear surface is multi level binary.

22. The lens system of claim 16, wherein the erecting lens means includes a first, a second, and a third erecting lens element, each erecting lens element having a front surface and a rear surface.

23. The lens system of claim 22, wherein the first, second, and third erecting lens elements and the eyepiece lens means have a sufficient positive power and are located to substantially cancel lateral chromatic aberration of the lens system.

24. The lens system of claim 22, wherein the rear surface of the first erecting lens element is aspheric, and the second and the third lens elements are identical.

25. The lens system of claim 22, wherein the rear surface of the first erecting lens element is adjacent to a first intermediate image such that the rear surface primarily corrects optical aberrations including field curvature, astigmatism and distortion.

26. The lens system of claim 22, wherein the rear surface of the third erecting lens element is aspheric.

27. The lens system of claim 26, wherein the third erecting lens element is adjacent a second intermediate image.

28. The lens system of claim 16, wherein the aspheric surface in the objective lens means introduces sufficient spherical aberration to substantially correct for spherical aberrations of the erecting lens means and the eyepiece means.

29. The lens system of claim 16, wherein each optical surface and lens surface is non plano.

30. The lens system of claim 16, further comprising:
(a) an aperture stop in the erecting lens means; and wherein the aspheric optical surface of the erecting lens means cancels spherical aberration, coma and astigmation to sufficiently self correct for optical aberrations to functionally cooperate with any one of a doublet objective lens means and a singlet objective lens means.

31. A lens system for an erecting telescope for magnifying an image comprising:
(a) an objective lens system having an aspheric surface; and
(b) an asymmetric terrestrial eyepiece group including a first, a second, and a third erecting element for erecting an image formed by the objective lens and an eyepiece lens for viewing the erected image, wherein one of the first, second and third erecting elements includes an aspheric surface and each erecting element has a clear aperture diameter to axial thickness ratio greater than one.

32. The lens system of claim 31, wherein the objective lens includes a doublet group having a first positive element with an aspheric front surface, and a negative second element.

33. The lens system of claim 31, wherein the objective lens includes a singlet having an aspheric front surface and a diffractive rear surface.

34. The lens system of claim 33, wherein the diffractive rear surface is kinoform.

35. The lens system of claim 33, wherein the diffractive rear surface is single level binary.

36. The lens system of claim 33, wherein the diffractive rear surface is multi level binary.

37. The lens system of claim 31, wherein the first, second, and third erecting elements and the eyepiece lens have a sufficient positive power and are located to substantially cancel lateral chromatic aberration of the telescope.

38. The lens system of claim 31, wherein the rear surface of the first erecting element is aspheric, and the second and third erecting elements are identical.

39. The lens system of claim 31, wherein a rear surface of the first erecting element is adjacent to a first intermediate image such that the rear surface primarily corrects optical aberrations including field curvature, astigmatism and distortion.

40. The lens system of claim 31, wherein the rear surface of the third erecting element is aspheric.

41. The lens system of claim 31, wherein the third erecting element is adjacent a second intermediate image.

42. The lens system of claim 31, wherein the aspheric surface in the objective lens means introduces sufficient spherical aberration to substantially correct for spherical aberrations of the eyepiece group.

43. The lens system of claim 31, wherein each optical surface and lens surface is non plano.

44. The lens system of claim 31, further comprising:
   (a) an aperture stop intermediate the first and second erecting element; and
   wherein the aspheric surface of the eyepiece group cancels spherical aberration, coma, and astigmatism to self correct for optical aberrations to functionally cooperate with any one of a doublet objective lens and a singlet objective lens such that magnification and field of view of the telescope are determined by the objective lens.

45. The lens system of claim 31, wherein the optical components are molded optical plastic.

* * * * *